United States Patent [19]
Rose

[11] Patent Number: 5,429,693
[45] Date of Patent: Jul. 4, 1995

[54] METHOD OF MAKING A PRESTRESSED COMPOSITE MATERIALS

[75] Inventor: David H. Rose, Dayton, Ohio

[73] Assignee: The United States of America as represented by the Secretary of the Air Force, Washington, D.C.

[21] Appl. No.: 194,435

[22] Filed: May 9, 1994

[51] Int. Cl.⁶ .............................................. B65H 81/00
[52] U.S. Cl. ...................................... 156/161; 156/169; 156/173; 156/175; 156/425; 249/178; 249/180
[58] Field of Search ............... 156/173, 175, 160, 161, 156/172, 169, 425; 249/178, 180, 181

[56] References Cited

U.S. PATENT DOCUMENTS

| | | |
|---|---|---|
| 2,297,648 | 9/1942 | Cushman . |
| 2,794,481 | 6/1957 | Anderson ..................... 156/194 X |
| 3,033,730 | 5/1962 | Martin ............................ 156/161 |
| 3,156,598 | 10/1964 | Martin ............................ 156/161 |
| 3,165,569 | 1/1965 | Bright ............................ 264/319 X |
| 3,770,539 | 11/1973 | Bullock ......................... 156/161 X |
| 3,986,383 | 10/1976 | Petteys . |
| 4,059,036 | 11/1977 | Hartley . |
| 4,421,806 | 12/1983 | Marks et al. . |
| 4,878,975 | 11/1989 | Schobermayer . |
| 4,883,549 | 11/1989 | Frost et al. . |
| 4,961,771 | 10/1990 | Brooke . |
| 5,071,506 | 12/1991 | Nelson et al. ................. 156/173 X |
| 5,084,219 | 1/1992 | Sigur ............................. 156/173 X |
| 5,125,993 | 6/1992 | Principe ........................ 156/173 X |

FOREIGN PATENT DOCUMENTS

| | | | |
|---|---|---|---|
| 57-210820 | 12/1982 | Japan ............................. 249/180 |
| 62-122742 | 6/1987 | Japan ............................. 249/178 |
| 140961 | 1/1961 | U.S.S.R. ........................ 156/173 |
| 1258703 | 9/1986 | U.S.S.R. ........................ 249/178 |

OTHER PUBLICATIONS

Lee, Henry, et al, "Epoxy Resins Their Application and Technology", 1957 McGraw-Hill Book Co., Inc., pp. 271–274.

Primary Examiner—Jeff H. Aftergut
Attorney, Agent, or Firm—Bobby D. Scearce; Thomas L. Kundert

[57] ABSTRACT

A method is described for forming a prestressed composite which comprises steps of applying matrix material to the fibers, selectively tensioning the fibers, winding the fibers on an adjustable mandrel and curing the matrix material with the fibers under tension.

10 Claims, 2 Drawing Sheets

METHOD OF MAKING A PRESTRESSED COMPOSITE MATERIALS

RIGHTS OF THE GOVERNMENT

The invention described herein may be manufactured and used by or for the Government of the United States for all governmental purposes without the payment of rely royalty.

BACKGROUND OF THE INVENTION

The present invention relates generally to composite structures and fabrication methods, more particularly to improved composite structures having prestressed fibers.

In a laminated composite material, temperature changes from fabrication to use mid differences in thermal expansion coefficients between the fiber and matrix materials combine to produce stresses in the composite layers which reduce the load which can be applied before onset of composite damage (first ply failure ). Because the temperature range over which composites are used is wide, stress levels produced as a result of processing may reduce the ultimate layer strength. Moreover, in some composites, such as carbon fiber composites, the coefficient of thermal expansion of the fiber along the fiber direction is different from that along a fiber radius so that a composite with all fibers oriented in the same direction will contract in the fiber direction differently from in the perpendicular direction. Composites typically comprise a plurality of unidirectional fiber layers, each layer having a preselected angular orientation with respect to adjacent layers to form a structure having desired stiffness and strength. Each layer may therefore contract differently from an adjacent layer with resulting stresses between layers.

In accordance with a governing principle of the invention, the three-dimensional stress state within a cured composite may be substantially relieved by prestressing the fibers during cure; prestressing also improves fiber linearity hi the composite. In composite fabrication according to the invention, a matrix impregnated fiber tow is tightly wound with preselected tension on an adjustable mandrel. The composite is conventionally cured at appropriate temperature in an autoclave with the fibers under tension. The degree of contraction of the fibers and matrix after cure depends on the magnitude of the tension applied to the fibers. The tension is induced by a combination of mechanical and thermal expansion of the mandrel. Stress fields with the composite are thereby modified, as compared to a composite conventionally processed, to a degree dependent on the magnitude of tension applied to the fibers.

It is therefore a principal object of the invention to provide an improved composite fabrication method.

It is a further object of the invention to provide a composite fabrication method comprising prestress of the composite fibers.

It is another object of the invention to provide a composite structure having improved strength and fiber linearity.

These and other objects of the invention will become apparent as a detailed description of representative embodiments proceeds.

SUMMARY OF THE INVENTION

In accordance with the foregoing principles and objects of the invention, described is a method for forming a prestressed composite which comprises steps of applying matrix material to the fibers, selectively tensioning the fibers, winding the fibers on an adjustable mandrel and curing the matrix material with the fibers under tension.

DESCRIPTION OF THE DRAWINGS

The invention will be more clearly understood from the following detailed description of representative embodiments thereof read in conjunction with the accompanying drawings wherein:

FIGS. 2a and 1b show respective top and edge views of a representative mandrel useful in applying mechanically and thermally induced load to the fibers;

DETAILED DESCRIPTION

In accordance with a governing principle of the invention, an improved prestressed composite laminate may be fabricated by applying a load to the fibers during cure of the matrix material. The applied load must be high enough to achieve desired stress modification in the cured composite, but not high enough to fracture the fibers. In the practice of the invention, load is applied to the fibers by a combination of mechanical prestressing during filament winding and thermal expansion of the mandrel during cure in order to stress the fibers uniformly, determinably and reproducibly.

Figure 1A:
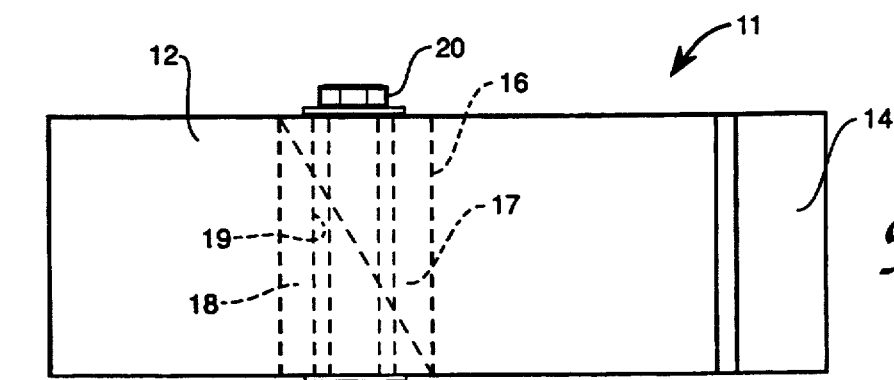
Figure 1B:
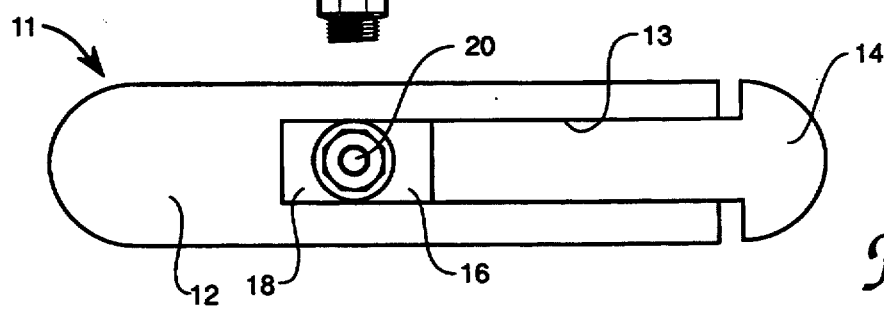

Referring now to the drawings, FIGS. 1a and 1b show respective top and edge views of a representative mandrel useful in applying mechanically or thermally induced load to fibers wound thereon. In FIGS. 1a, 1b, mandrel 11 includes first female member 12 having lengthwise slot 13 for receiving second male member 14. Mechanical expander 16 is disposed within slot 13 between members 12, 14 for selectively positioning member 14 within slot 13. Expander 16 may, in an exemplary configuration comprise a pair of triangular blocks 17,18 having a lengthwise slot 19 for receiving connecting bolt 20. Expander 16 is adjusted in width within slot 13 by tightening bolt 20 which results in movement of blocks 17,18 along their oblique contacting surfaces. Member 14 can thereby be selectively positioned along slot 13, and when fiber (not shown in FIGS. 1a, 1b) is wound on mandrel 11, adjustment of expander 16 as just described results in outwardly movement of member 14 and resultant tension on the wound fiber.

It is noted that tension on the wound fiber may result both from mechanical adjustment of expander 16 and from thermal expansion of the component pans of mandrel 11. particularly members 12, 14, during cure of the composite, in an alternative embodiment, members 12,14 may comprise a material having a very small coefficient of thermal expansion so that tens ion in the wound fiber is applied substantially only mechanically. In another alternative, expander 16 may be replaced with a block or bar of known (high) coefficient of thermal expansion for thermal-only control of fiber tension.

Figure 2:
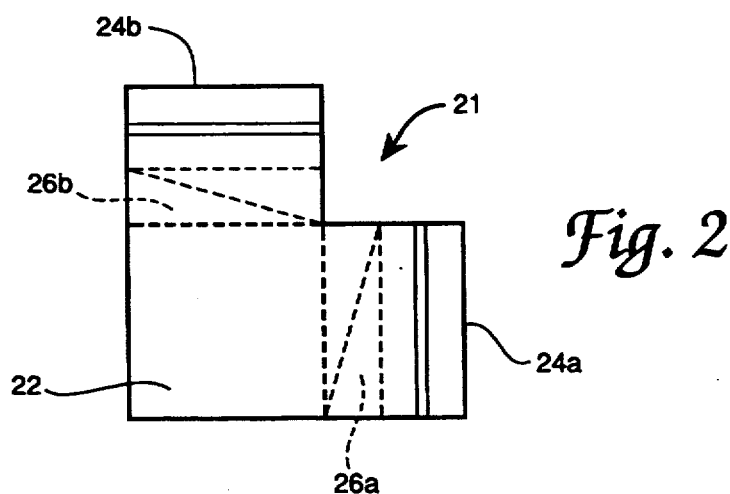
FIGS. 2 shows a schematic of a mandrel representative of that useful for winding and tensioning fiber in two or more directions.

The maximum tension which may be applied to a fiber without breakage through mechanical adjustment and thermal expansion of mandrel 11 will vary widely depending on fiber material selection and may be determined by a skilled practitioner guided by these teachings in consideration of the tens fie strength of the selected material. Tensions of up to about 350 kpsi may be obtained. Tension applied to the wound fiber as suggested in relation to FIGS. 1a, 1b may be applied in two or more directions using mandrel 21 such as that suggested in FIG. 2 wherein first member 22 is slotted on two or more sides to receive a corresponding number of male members 24a,24b and mechanical expanders 26a, 26b. The mandrel may therefore, within the scope of these teachings, be configured to accommodate fiber winding and tensioning in two or more directions, and the mandrel configurations described herein are not considered limiting of the invention.

Figure 3:
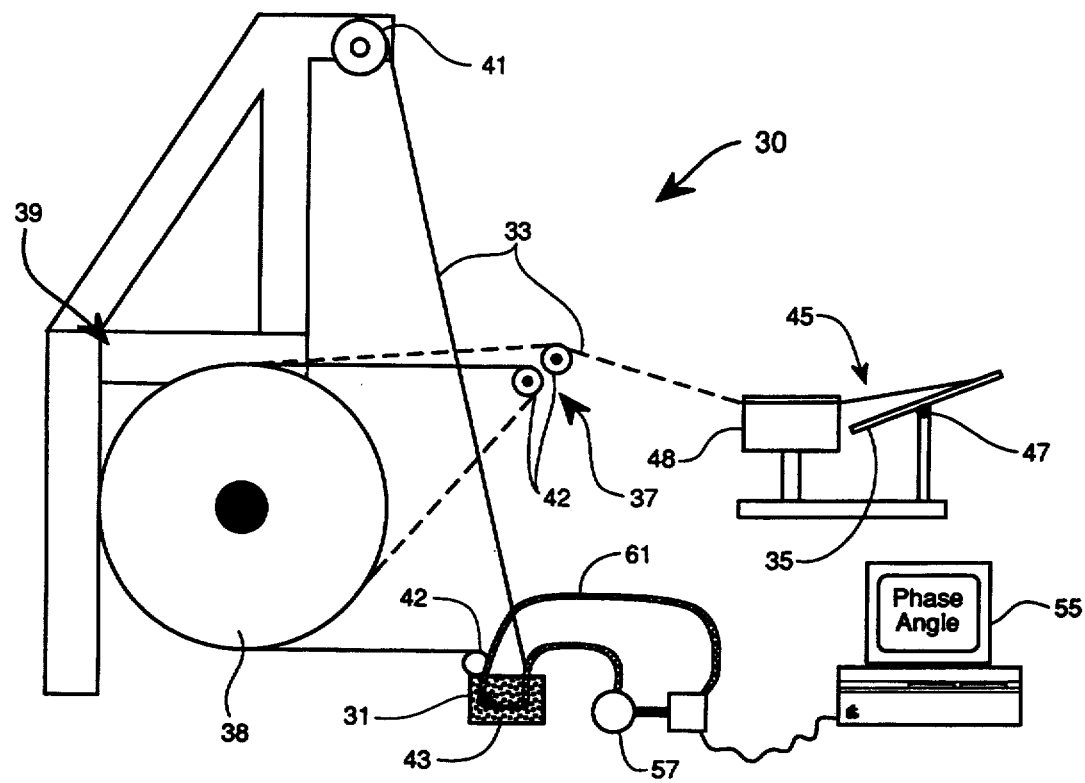
FIG. 3 shows a representative system useful in applying resin matrix material to filament material and winding the filament onto a mandrel with preselected tension according to the invention.

FIG. 3 shows a representative system 30 useful in applying resin matrix material 31 to tow 33 comprising a fiber bundle and in winding tow 33 onto mandrel 35 with preselected tension according to the invention. Matrix 31 may be any suitable material as might occur to one skilled in the applicable art, such as epoxy (such as Hercules 3501-6 or other commercially available epoxy), BMI, glass, ceramic, polyimide or thermoplastic. Tow 33 may comprise a bundle of up to 1000 to 12000 fibers of any suitable material such as carbon (such as that available commercially as AS-4 from Hercules), graphite, glass, silicon carbide or aramid (KEVLAR ®). Although the invention may be most applicable to filament winding in the fabrication of cylindrical structures, such as pressure vessels and tubes, system 30 was configured to utilize flat mandrel 35 of aluminum of known thermal expansion coefficient so that uniaxial testing of composite specimens could be performed in demonstration of the invention.

It is noted that in filament winding cylindrical structures, the fibers and matrix tend to self-compact, so that pressure need not be applied during cure. But because only the wound portion at the rounded edges of a wound flat plate self-compact, external pressure was applied during cure (e.g. conventional graphite/epoxy cure cycle at 100 psi and 350° F.).

In the demonstration system, winding tension in tow 33 was selected to avoid fiber slack on wound mandrel 35 and was attained using tensioning mechanism 37 including drum 38 contacted by brake 39, the inertia of drum 38 along with friction of brake 39 providing the desired tension. Tow 33 from spool 41 was drawn over pulleys 42 through resin bath 43 (for impregnation with matrix material) and twice around drum 38, substantially as shown in FIG. 3, and into winding system 45. Substantial tension in tow 33 had to be maintained during winding, so it was preferable to impregnate tow 33 with resin prior to inducing tension because the tension reduces liquid resin migration toward the center of tow 33 and may result in a composite product having resin-starved areas and high fiber volume. Pulleys 42 and other rollers used in system 30 for guiding tow 33 comprised TEFLON ® and DELRIN ® to avoid the contacted surfaces becoming gummed with resin. Winding system 45 of the demonstration system comprised two independently controlled motors 47,48 for rotating mandrel 35 and controlling traverse of tow 33 across mandrel 35 in producing fiber layers having the desired respective fiber orientations. It is noted that other winding systems for tow 33 may be used as would occur to the skilled artisan guided by these teachings, the specific system shown not being considered limiting of the invention.

Impregnation of tow 33 with resin 31 may be performed using any suitable means as would occur to the skilled artisan, such as a hot melt procedure wherein resin 31 is melted and tow 33 is passed through pure resin, or dissolution of the resin in suitable solvent and passing tow 33 through the solution. The solution impregnation techniques are preferred because the length of travel of the hot melt impregnated tow 33 allows for resin 31 to harden which interferes with the winding process. However, the length of travel of the solution impregnated tow 33 allows for an unacceptable amount of solvent evaporation so that the pulleys and dram become sticky with resin which fractures individual fibers. This problem was resolved by using a hybrid solvent obtained by mixing two different solvents. The hybrid solvent minimized solvent evaporation and also lubricated pulleys 42. Solvents useful for the resin 31 materials listed above include methylethyl ketone, acetone or others as would occur to the skilled artisan practicing the invention; in a ceramic or glass matrix, the solvent required may be water. In demonstration of the invention, wherein Hercules 3501-6 epoxy resin was used as matrix 31 material, a mixture of acetone and isopropyl alcohol was used as the hybrid solvent. Solvent entrapment problems which may cause high porosity in the laminate product were avoided by debulking the composite prior to cure using a vacuum and a slightly elevated temperature in an autoclave or vacuum oven at about 125° F. for about 4 hours or more depending on the thickness of the winding.

Figure 4:
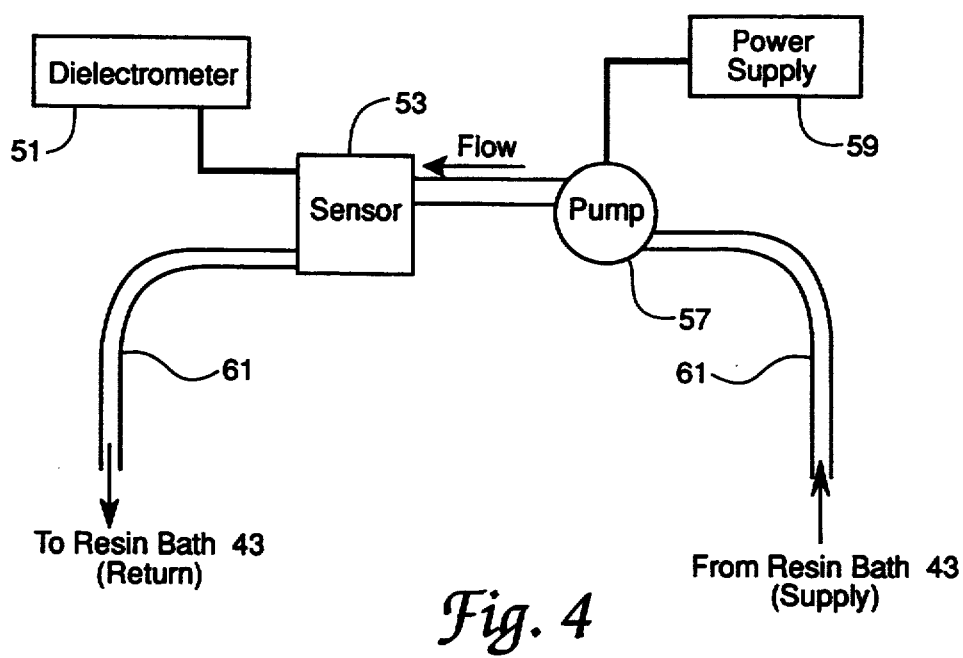
FIG. 4 is a schematic of the circulation and dielectric sensor systems for controlling resin/solvent content in the FIG. 3 system.

Resin/solvent solution viscosity was monitored to maintain an optimum resin content in the solution. As shown in FIG. 4, a monitoring and solution content control system used in conjunction with system 30 included a Micromet Eumetric System II Microdielectrometer 51 (Micromet Instruments, Inc., Cambridge Mass.) and an Idex sensor 53 (Micromet Instruments, Inc., Newton Centre Mass.), controlled by computer 55, which measured the solution phase angle, and pump 57 powered by power supply 59 for circulating solvent through lines 61 to bath 43 as needed to keep the resin/solvent solution adequately mixed and at the desired preselected concentration.

Tests on AS-4/3501-6 (fiber/resin) prestressed composite specimens fabricated according to the invention and corresponding conventional composite specimens showed that, for the geometry of composite specimens tested, the prestressed specimens showed an approximate 15% increase in tensile strength and that damage due to loading was delayed in the prestressed materials. Theoretical models (see, e.g., Rose et al. "Effect of Prestressed Fibers Upon the Response of Composite Materials", Proc Am Soc for Composites, 8th Technical Conference on Composite Materials (October 1993)) predict that for some laminate geometries, onset of damage (first ply failure) in prestressed materials can be substantially reduced or eliminated, which is important because cracks associated with first ply failure are believed to be initiation sites for fatigue cracking in dynamic structures.

The invention therefore provides an improved composite fabrication process including fiber prestressing. It is understood that modifications to the invention may be made within the scope of the appended claims as might occur to one with skill in the field of the invention. All embodiments contemplated hereunder which achieve the objects of the invention have therefore not been shown in complete detail. Other embodiments may be developed without departing from the spirit of the invention or from the scope of the appended claims.

I claim:

1. A method for forming a prestressed composite, comprising the steps of:
   (a) providing a source of fibers and a source of resin matrix material;
   (b) providing a mechanically expandable mandrel comprising a material of a known coefficient of thermal expansion greater than that of said fibers and matrix material;
   (c) applying said matrix material to said fibers;
   (d) selectively tensioning said fibers and winding said fibers with preselected tension onto said mandrel;
   (e) mechanically expanding said mandrel with said fibers wound thereon to impart a preselected tension in said fibers; and
   (f) heating said mandrel with said fibers and matrix material wound thereon to elevated temperature to thermally expand said mandrel and to cure said matrix material with said fibers under tension.

2. The method of claim 1 wherein said fibers comprise a material selected from the group consisting of carbon, graphite, glass, silicon carbide and aramid.

3. The method of claim 1 further comprising the step of selectively applying pressure to said mandrel with said fibers wound thereon during said heating step.

4. The method of claim 1 wherein said resin is in solution.

5. The method of claim 4 wherein said resin is dissolved in a mixture of acetone and isopropyl alcohol.

6. In a method for forming a prestressed fiber/resin matrix material composite comprising fibers in a matrix, an improvement comprising the steps of:
   (a) providing a mechanically expandable mandrel comprising a material of known coefficient of thermal expansion greater than that of said fibers and matrix material;
   (b) applying resin matrix material to said fibers;
   (c) selectively tensioning said fibers and winding said fibers with preselected tension onto said mandrel;
   (d) mechanically expanding said mandrel with said fibers wound thereon to impart a preselected tension in said fibers; and
   (e) heating said mandrel with said fibers and matrix material wound thereon to elevated temperature to thermally expand said mandrel and to cure said matrix material with said fibers under tension.

7. The method of claim 6 wherein said fibers comprise a material selected from the group consisting of carbon, graphite, glass, silicon carbide and aramid.

8. The method of claim 6 further comprising the step of selectively applying pressure to said mandrel with said fibers wound thereon during said heating step.

9. The method of claim 6 wherein said resin matrix material is in solution.

10. The method of claim 9 wherein said resin matrix material is dissolved in a mixture of acetone and isopropyl alcohol.

* * * * *